United States Patent [19]

Yamada et al.

[11] Patent Number: 4,544,514
[45] Date of Patent: Oct. 1, 1985

[54] UNIFORM DISTRIBUTOR APPARATUS FOR A GASEOUS AND LIQUID PHASE FLUID

[75] Inventors: Kaneo Yamada; Shigemi Okamoto, both of Akashi; Kazuhiko Asada, Hyogo, all of Japan

[73] Assignee: Kabushiki Kaisha Kobe Seiko Sho, Kobe, Japan

[21] Appl. No.: 532,902

[22] Filed: Sep. 16, 1983

[30] Foreign Application Priority Data

Sep. 16, 1982 [JP] Japan .................................. 57-161983

[51] Int. Cl.⁴ ............................................... B01F 3/04
[52] U.S. Cl. ...................................... 261/153; 165/60; 261/110
[58] Field of Search .................. 261/97, 110, 112, 141, 261/153, 98; 165/60, 166

[56] References Cited

U.S. PATENT DOCUMENTS

| | | | |
|---|---|---|---|
| 1,768,162 | 6/1930 | Sperr, Jr. | 261/110 X |
| 2,490,080 | 12/1949 | Melvill | 261/110 |
| 2,946,726 | 7/1960 | Markels, Jr. | 261/97 X |
| 3,079,092 | 2/1963 | Meek et al. | 261/112 X |
| 3,282,334 | 11/1966 | Stahlheber | 261/112 X |
| 3,419,251 | 12/1969 | Eckert | 261/98 X |
| 4,299,786 | 11/1981 | Sanderson et al. | 261/112 X |

FOREIGN PATENT DOCUMENTS

| | | | |
|---|---|---|---|
| 2404190 | 9/1978 | France | 261/112 |
| 413947 | 7/1934 | United Kingdom | 261/153 |
| 1163288 | 9/1969 | United Kingdom | 261/153 |
| 1337771 | 11/1973 | United Kingdom | 261/97 |

*Primary Examiner*—Richard L. Chiesa
*Attorney, Agent, or Firm*—Oblon, Fisher, Spivak, McClelland & Maier

[57] ABSTRACT

An apparatus for uniformly distributing a liquid having dual gaseous and liquid phases for use with a heat exchanger is disclosed. A liquid spreading device of the apparatus includes a main pipe extending along the full length of a header of the apparatus, and a plurality of branch pipes connected to the main pipe and extending perpendicularly to the main pipe just above and along the full width of descending flow entrances of a core of the heat exchanger. Each branch pipe has a plurality of liquid spreading holes perforated in a predetermined spaced relationship at the bottom thereof. Thus, liquid can be distributed from the apparatus substantially uniformly within a deviation of, for example, ±10 percent.

5 Claims, 5 Drawing Figures

UNIFORM DISTRIBUTOR APPARATUS FOR A GASEOUS AND LIQUID PHASE FLUID

BACKGROUND OF THE INVENTION

1. Field of the Invention

This invention relates to a uniform distributor apparatus for uniformly distributing a fluid having dual gaseous and, liquid phases, and more particularly, to an apparatus for uniformly distributing a gaseous and liquid phase fluid to entrances of a core of a heat exchanger.

2. Description of the Prior Art

In heat exchangers employed in various chemical plants or in cryogenic separating or liquefying apparatus, in order to uniformly distribute a liquid having dual gaseous and liquid phases to a core of such a heat exchanger in the widthwise direction of the core, it has been proposed that the fluid is first separated, outside the heat exchanger, into a gaseous phase and a liquid phase, which are then separately introduced into a distributing apparatus integrally disposed on the top of the heat exchanger so that it may be distributed uniformly to entrances of the core by means of the distributor. One of such distributors is disclosed in the specification of, for example, U.S. Pat. No. 3,282,334, and this distributor has a structure as shown in FIG. 1. Thus, this apparatus includes a header 2 disposed on the top of a core 1 of a heat exchanger and extends along the height of the core 1, and a spreading pipe 3 extending along the length of the core 1 and having a plurality of spaced rows of spreading holes 4 formed radially therein, wherein a liquid can be distributed to entrances 5 of a triangular fin section 7 connected to descending flow passages 8 from the spreading holes 4 of the spreading pipe 3 independently of the rate of distribution of gas from a feed gas nozzle 6 to the entrances 5 of the descending flow passages 8 via the header 2. However, although the spreading holes 4 in each row are differentially spaced from each other, that is, the distance between adjacent spreading holes near an end of each row is made, in the disclosed apparatus, smaller than the distance between adjacent spreading holes near the center of each row in order to attain uniform distribution of liquid in the widthwise direction of the core, a greater amount of liquid will still be distributed around the center than around opposite ends of each row. Accordingly, the apparatus is disadvantageous in that liquid is not distributed uniformly over the entire width of the core and fluctuation of the amount of liquid will cause fluctuation in the distribution of the liquid.

SUMMARY OF THE INVENTION

Accordingly, the present invention has been devised in consideration of such problems as described above, and it is an object of the invention to provide an apparatus which can assure uniform distribution of descending flows of a gaseous and liquid phase fluid irrespective of any fluctuation in the amount of flow of such liquid.

According to the present invention, there is provided an apparatus for uniformly distributing a gaseous and liquid phase fluid, said apparatus being of the type which includes a header which is disposed on the top of a core having descending flow entrances formed therein in a predetermined spaced relationship relative to each other and which surrounds a spacing above said descending flow entrances, a gas feed nozzle connected to said header for feeding gas into said header, and a liquid spreading device disposed within and extending along the length of said header, wherein said liquid spreading device comprises a main pipe extending along the full length of said header, and a plurality of branch pipes connected to said main pipe and extending perpendicularly to said main pipe just above and along the full width of said descending flow entrances of said core, each of said branch pipes having a plurality of liquid spreading holes formed therein with a predetermined spaced relationship in the bottom along the full length thereof. The branch pipes may be varied in number in accordance with the number of the descending flow entrances of the core.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENT

Figure 1:
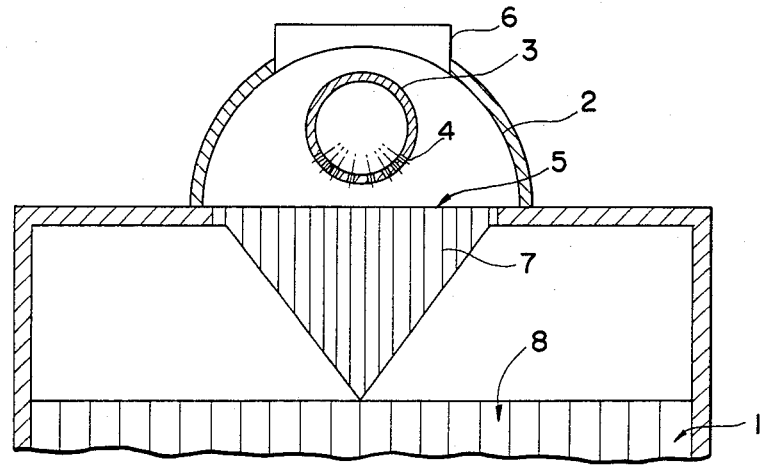
FIG. 1 is a cross sectional view of a portion of a conventional apparatus for uniformly distributing a gaseous and liquid phase fluid.
Figure 2:
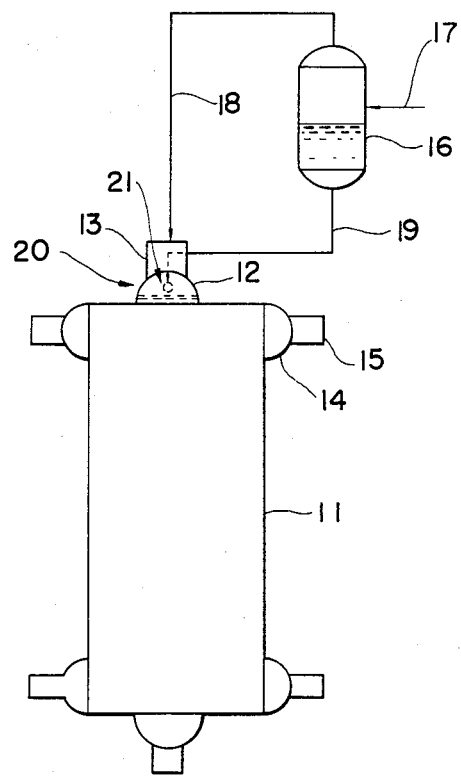
FIG. 2 is a side elevational view of an aluminum brazed plate fin type heat exchanger in accordance with the present invention.

Referring first to FIG. 2, there is illustrated an example of an aluminum brazed, plate fin type heat exchanger to which the apparatus of the present invention is applied. The heat exchanger includes a core 11, a first header 12 for feeding a liquid having gaseous and liquid phases to entrances of descending flow passages of the core 11, a gas feed nozzle 13 for feeding gas to the first header 12, a second header 14 for feeding a second fluid into the core 11, a nozzle 15 for feeding a fluid to the second header 14, and a gas liquid separator 16 for separating a gaseous and liquid phase fluid fed thereto by way of a line 17 into gas and liquid. From the gas-liquid separator 16, gas is fed to a uniform distributor apparatus 20 by way of a line 18 while liquid is fed to the apparatus 20 by way of another line 19. Though not shown, a pump may be provided for the line 19 for pumping liquid to the uniform distributor apparatus 20.

Figure 3:
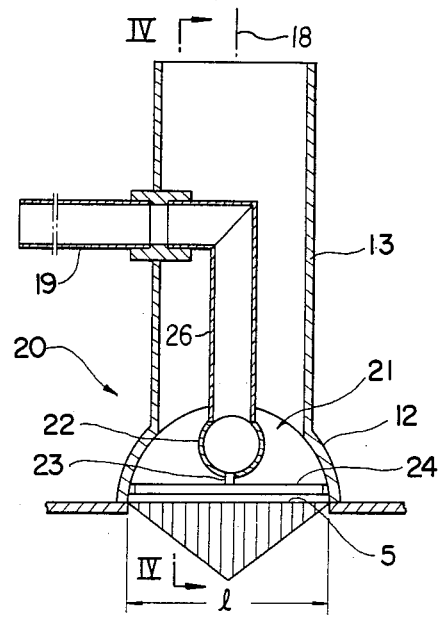
FIG. 3 is a cross sectional view of an apparatus for uniformly distributing a gaseous and liquid phase fluid in the heat exchanger of FIG. 2.
Figure 4:
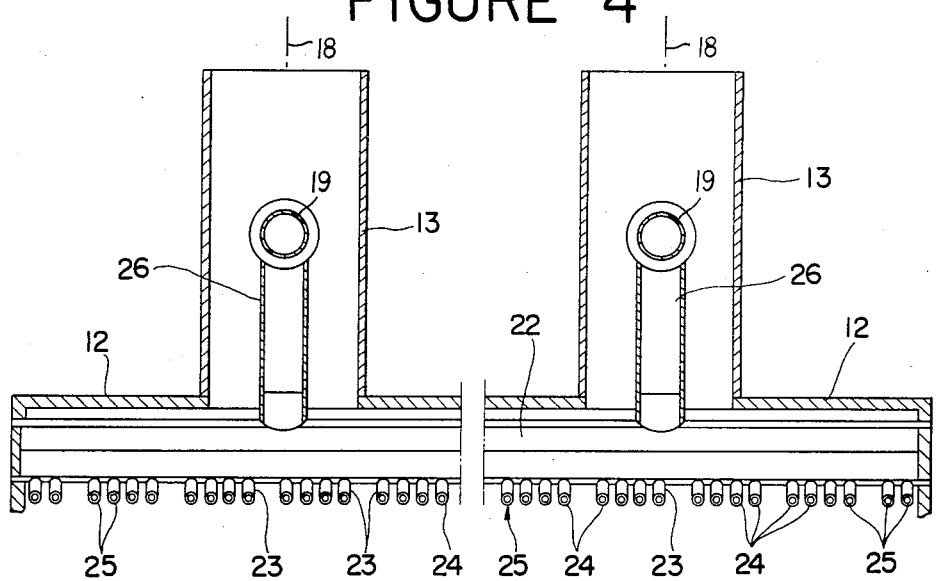
FIG. 4 is a sectional view taken along line IV—IV of FIG. 3.
Figure 5:
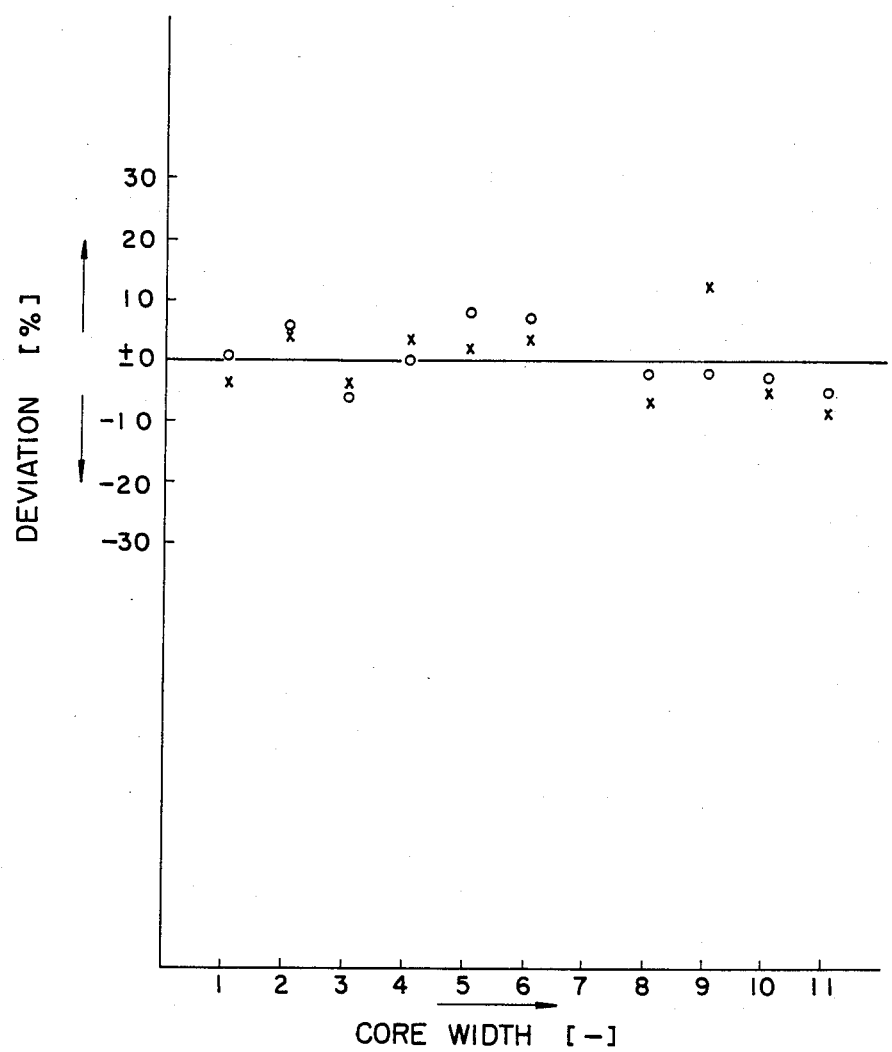
FIG. 5 is a diagrammatic representation showing distribution of liquid by an apparatus for uniformly distributing a gaseous and liquid phase fluid according to the present invention.

Referring now to FIGS. 3 and 4, the apparatus for uniformly distributing a gaseous and liquid phase fluid according to the present invention includes the first header 12 which surrounds a spacing above descending flow entrances provided in a predetermined spaced relationship on the top of the core 11. The apparatus further includes a pair of the gas feed nozzles 13 which extend uprightly from the top of the first header 12, and a liquid spreading device 21 extending within and along the length of the first header 12. The liquid spreading device 21 includes a main pipe 22 extending along the full length of the first header 12, a plurality of short pipes 23 secured to and located directly below the main pipe 22 in a predetermined spaced relationship relative to each other, and a plurality of branch pipes 24 each secured to the bottom end of a respective one of the short pipes 23 and extending perpendicularly to the main pipe 22 along the full width of the descending flow entrances 5 of the core 11. Each of the branch pipes 24 has a plurality of liquid spreading holes 25 perforated in the bottom along the full length thereof in a predetermined spaced relationship relative to each other. The main pipe 22 has a pair of liquid feed pipes 26 extending uprightly therefrom so that liquid may be fed by way of the liquid feed pipes 26 and the line 19.

Where the uniform distributor apparatus having such a construction as described above is used, gas feed by way of the line 18 passes the gas feed nozzle 13 and the first header 12 and is then dispersed to the entrances 5 of the descending flow passages of the core 11 similarly as in a conventional manner, while liquid fed from the line 19 to the main pipe 22 of the liquid spreading device 21 is uniformly distributed to the individual entrances 5 of the descending flow passages from the branch pipes 24 located above the entrances 5. Incidentally, a core was tentatively divided into up to eleven sections in the widthwise direction thereof and pure water was pumped to its main pipe in order to find deviations from an average of amounts of water flowing into the individual sections of the core. The results are diagrammatically shown in FIG. 5. In FIG. 5, marks o and x represents the results when the rate of water fed to the main pipe 22 is 0.57 m/sec and 0.38 m/sec, respectively.

As apparent from the results as seen in FIG. 5, the uniform distributor apparatus for uniformly distributing a gaseous and liquid phase fluid according to the present invention can distribute liquid substantially uniformly within a deviation of less than ±10 percent. Moreover, even if the flow rate fluctuates, the apparatus can follow such fluctuations to distribute liquid uniformly.

What is claimed as new and desired to be secured by Letters Patent of the United States is:

1. A heat exchanger assembly comprising:
   (a) a heat exchanger core having a plurality of upwardly open, uniformly spaced descending flow passages therein;
   (b) a gas-liquid separator;
   (c) a header extending along the full length of said heat exchanger core, said header being downwardly open so as to be in fluid communication with said plurality of upwardly open, uniformly spaced descending flow passages in said heat exchanger core;
   (d) at least one line for feeding gas from said gas-liquid separator to the interior of said header, from which the gas flows uniformly into said plurality of upwardly open, uniformly spaced descending flow passages in said heat exchanger core;
   (e) a main pipe centrally located in said header and extending along the full length of said header;
   (f) at least one line for feeding liquid from said gas-liquid separator to the interior of said main pipe;
   (g) a plurality of short pipes extending downwardly from said main pipe in a line extending along the full length of said main pipe, said plurality of short pipes being in a predetermined spaced relationship relative to each other, each of said plurality of short pipes being entirely contained within said header and the interior of each of said plurality of short pipes being in fluid communication with the interior of said main pipe; and
   (h) two branch pipes extending horizontally from the bottom of each of said plurality of short pipes, said two branch pipes extending in opposite directions perpendicularly to each of said plurality of short pipes, each of said branch pipes being entirely contained within said header and the interior of each of said branch pipes being in fluid communication with the interior of the corresponding one of said plurality of short pipes, each of said branch pipes having a plurality of vertically directed liquid spreading holes perforated in the bottom thereof along the full length thereof in a predetermined spaced relationship relative to each other, said plurality of vertically directed liquid spreading holes being closely spaced to said plurality of upwardly open, uniformly spaced descending flow passages in said heat exchanger core, whereby the liquid flows uniformly and vertically downwardly from said plurality of vertically directed liquid spreading holes in said branch pipes into said plurality of upwardly open, uniformly spaced descending flow passages in said heat exchanger core.

2. A heat exchanger assembly as recited in claim 1 wherein a plurality of lines for feeding gas from said gas-liquid separator to the interior of said header are in fluid communication with the interior of said header at spaced intervals along the length thereof.

3. A heat exchanger assembly as recited in claim 2 wherein a plurality of lines for feeding liquid from said gas-liquid separator to the interior of said main pipe are in fluid communication with the interior of said main pipe at spaced intervals along the length thereof.

4. A heat exchanger assembly as recited in claim 1 wherein a plurality of lines for feeding liquid from said gas-liquid separator to the interior of said main pipe are in fluid communication with the interior of said main pipe at spaced intervals along the length thereof.

5. A heat exchanger assembly as recited in claim 1 wherein:
   (a) said heat exchanger core comprises a triangular fin section located adjacent to said branch pipes and
   (b) said plurality of upwardly open, uniformly spaced descending flow passages extend through said triangular fin section.

* * * * *